J. Q. COLLINS.
Hay-Loaders.
No. 152,607.
3 Sheets--Sheet 1.
Patented June 30, 1874.
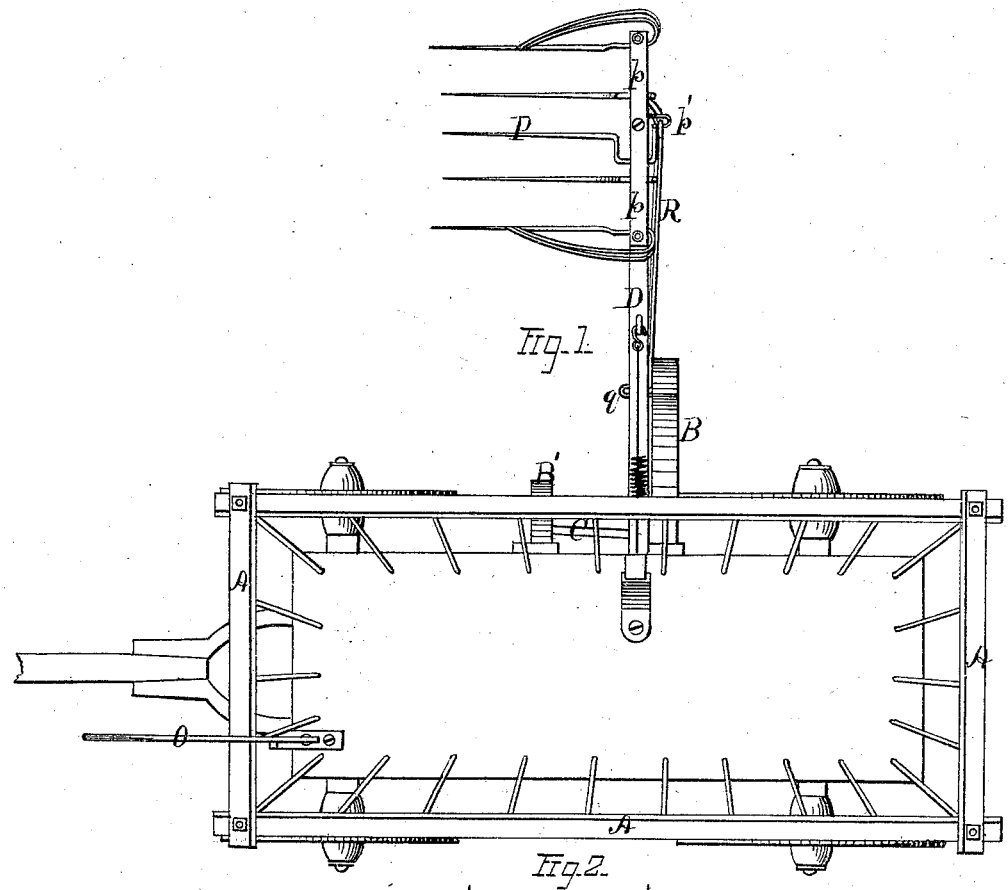
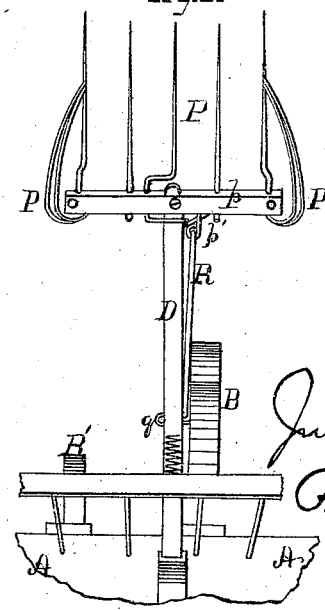

J. Q. COLLINS.
Hay-Loaders.

No. 152,607. Patented June 30, 1874.

3 Sheets--Sheet 2.

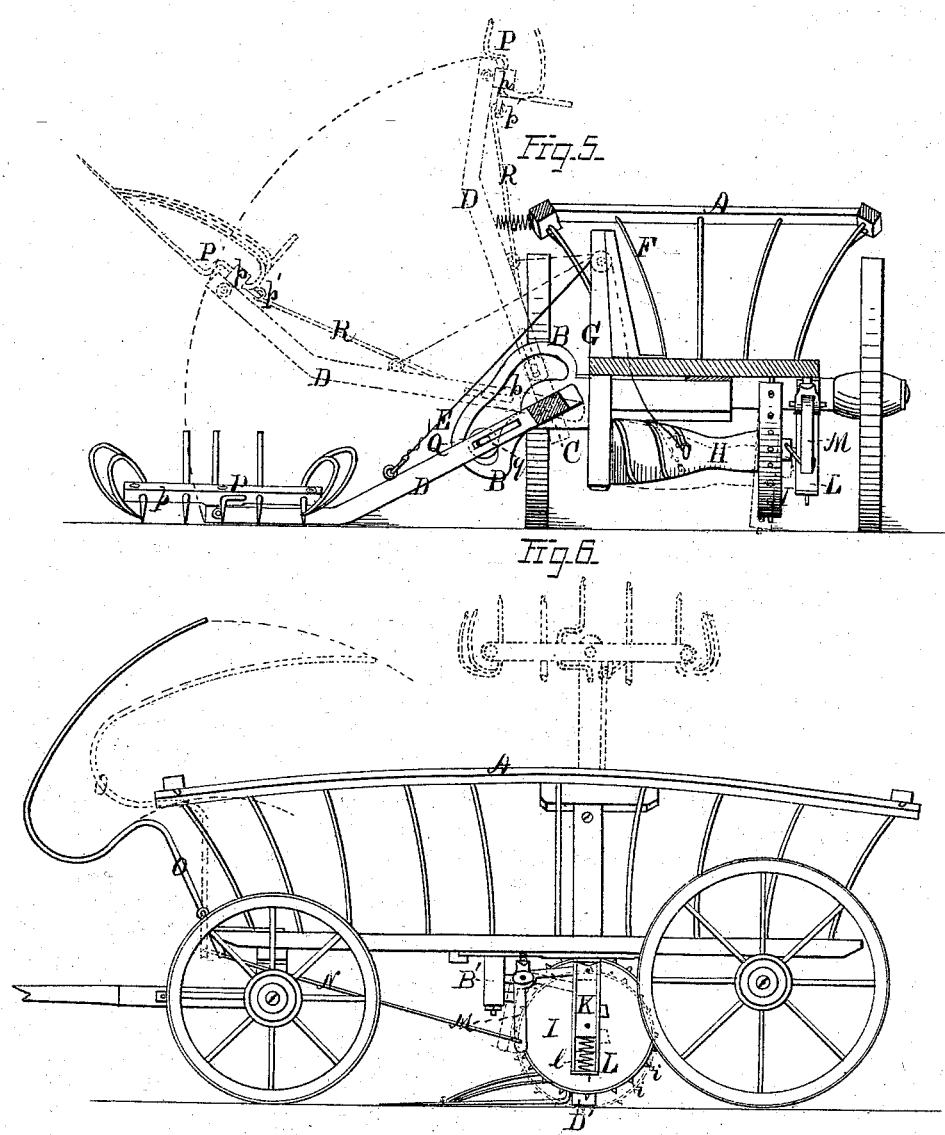

UNITED STATES PATENT OFFICE.

JOHN Q. COLLINS, OF VASSALBOROUGH, MAINE.

IMPROVEMENT IN HAY-LOADERS.

Specification forming part of Letters Patent No. 152,607, dated June 30, 1874; application filed May 29, 1874.

*To all whom it may concern:*

Be it known that I, JOHN Q. COLLINS, of Vassalborough, in the county of Kennebec and in the State of Maine, have invented certain new and useful Improvements in Hay-Loaders; and do hereby declare that the following is a full, clear, and exact description thereof, reference being had to the accompanying drawings making a part of this specification, in which—

Figure 3:
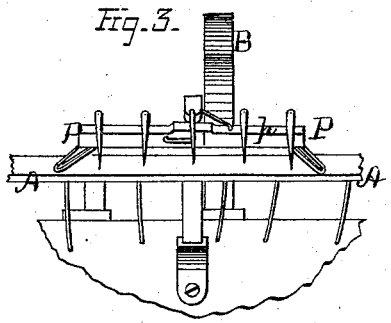
Figure 4:
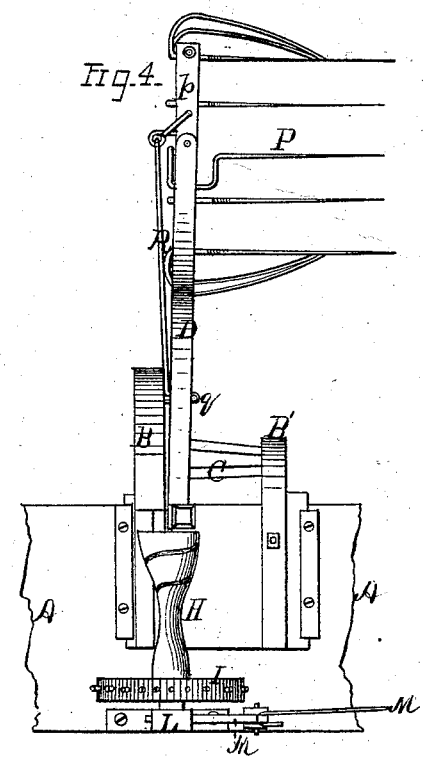

Figure 1 is a plan view of the upper side of my improved device as arranged for use. Fig. 2 is a like view of the rake when turned and about to be raised. Fig. 3 is a plan view of said rake raised to a vertical position so as to drop its load into the wagon. Fig. 4 is a like view of the lower side of the rake and its operating mechanism, said parts occupying the position shown in Fig. 1. Fig. 5 is a front elevation of said operating mechanism, the dotted lines showing the different positions assumed by the rake while passing from a horizontal to a vertical position; and Fig. 6 is a side elevation of said mechanism, showing the construction and operation of the tripping devices.

Letters of like name and kind refer to like parts in each of the figures.

My invention is designed for use in gathering hay; and it consists, principally, in the construction and operation of the hay-rake, and in the means employed for raising it from a horizontal to a vertical position, substantially as and for the purpose hereinafter specified. It consists, further, in the means employed for changing the position of the rake with relation to its lifting-bar, substantially as and for the purpose hereinafter shown. It consists, further, in the means employed for operating the windlass that is used for raising the rake, substantially as is hereinafter shown and described. It consists, finally, in the means employed for throwing the operating traction-wheel into engagement with the ground, substantially as and for the purpose hereinafter specified.

In the annexed drawings, A represents a hay-rack, which has the usual construction, and is secured upon and supported by the usual running-gear of a wagon. Pivoted between suitable lugs B and B', that are attached to and extend outward from one side of the bottom of the hay-rack A, is a short bar, C, to which is attached one end of a lifting-bar, D, that from thence extends radially outward, and has such conformation, longitudinally, as to cause its outer portion to conform to the line of the general surface of the ground when resting thereon, said bar D being capable of passing from such horizontal position to a vertical position, as seen in Fig. 5. From a point midway between the ends of the bar D, a cord or chain, E, passes upward and inward over a pulley, F, that is journaled upon the upper end of a standard, G, and from thence downward to and around a windlass, H, that is journaled within suitable bearings attached to the lower side of the rack-bottom, said windlass being arranged horizontally and at a right angle to the line of the draft. As thus arranged, by rotating said windlass forward or rearward said bar D will be raised or lowered. Upon the end of the windlass-shaft, opposite to the bar D, is placed a wheel, I, which has such dimensions as to cause its lower side to just clear the surface of the ground, and is provided upon its tread with spurs $i$ and $i$, or their equivalents. The end of the windlass-shaft, immediately outside the wheel I, is journaled within a box, K, that is contained within a vertically-slotted standard, L, said box being capable of sufficient vertical motion to enable said wheel to be brought into or removed from contact with the ground. A spring, $l$, placed within the slotted standard, below the box K, presses the latter upward to its farthest limit, while a downward movement is produced by a bell-crank lever, M, that is pivoted upon the lower side of the rack-bottom in such position as to cause one of its arms to bear at its rear end upon the upper side of said box, while to the lower end of its opposite arm is attached a rod, N, that passes forward and is attached to the lower end of a lever, O, which lever is in turn pivoted to or upon the forward end of said rack-bottom. By moving the upper end of the lever O rearward the box K will be depressed until the traction-wheel I is brought into contact with the ground and the windlass caused to revolve, while upon releasing said lever said box will be raised to its normal position and the motion of said windlass arrested.

The mechanism described is for operating a rake, P, which has its head $p$ pivoted to or upon the outer end of the bar D. When in use it is necessary that said rake should have its tines in a line with the draft while gathering up the hay, and that said tines should occupy a position at a right angle to the draft while raising said hay and depositing the same in the rack. To effect such result, the following-described mechanism is employed: The lug B, which forms one of the pivotal bearings for the bar D, is extended outward and downward, and within its forward face is provided a groove, $b$, that from its upper inner end outward and downward for about one-half its length is concentric with said pivotal bearings, while from said point said groove extends outward and downward in nearly a straight line, and finally terminates in a downward curve that is concentric to said pivotal bearings. Within the groove $b$ is fitted a roller, Q, that is journaled upon the end of a bar, $q$, which slides within a longitudinal slot, $d$, that is formed within the bar D, such arrangement enabling roller Q to follow the line of said groove as said bar D is raised or lowered. From the roller-bar $q$ a rod, R, extends outward to the rake P, and is pivoted to a stud, $p'$, that extends outward at a right angle from the head $p$, at a short distance outside of the pivotal bearing of the latter. If, now, the bar D is raised, the roller Q will travel rapidly inward within the groove $b$, and through the rod R will turn the rake to the position shown in Fig. 2, which position will be maintained to the end of the upward stroke, so that when said rake has reached its highest point it will deliver its load squarely into the hay-rack. Upon the downward movement the motion of the rake will be reversed, so that when reaching the ground its teeth will be again turned to the front and in position for gathering the hay.

The wagon, with its attachments, is driven across a field after the hay has been cut, the rake dropped upon the ground, and when filled with hay is caused to rise and deposit its load in the rack, such operations being controlled by the lever O, which is manipulated by the driver, and requiring but a slight expenditure of strength upon the draft-animals.

Having thus fully set forth the nature and merits of my invention, what I claim as new is—

1. The rake P $p$, pivoted to or upon the outer end of the lifting-bar D, and combined therewith and with the windlass H, cord E, and pulley F, substantially as and for the purposes specified.

2. In combination with the lifting-bar D, and rake P pivoted thereon, the lug B, provided with the cam-groove $b$, the bar $q$, the roller Q, and the rod R, extending between said bar $q$ and the stud $p'$ of said rake, substantially as and for the purpose shown.

3. In combination with the windlass H, the ground-wheel I, made adjustable vertically toward or from the ground, substantially as and for the purpose shown and described.

4. In combination with the windlass H and vertically-adjustable ground-wheel I, the levers M and O and the rod N, substantially as and for the purpose specified.

In testimony that I claim the foregoing I have hereunto set my hand this 15th day of May, 1874.

JOHN Q. COLLINS.

Witnesses:
 JOHN HOMANS,
 GEORGE H. CATES.